(12) United States Patent
Perillon et al.

(10) Patent No.: US 10,722,069 B2
(45) Date of Patent: **\*Jul. 28, 2020**

(54) COOKING UTENSIL COMPRISING A HARD BASE MADE FROM CERAMIC AND/OR METAL AND/OR POLYMER MATERIAL AND A NONSTICK COATING CONTAINING A FLUOROCARBON RESIN

(71) Applicant: SEB S.A., Ecully (FR)

(72) Inventors: Jean-Luc Perillon, Saint Paul Trois Chateaux (FR); Michel Fontaine, Sales (FR)

(73) Assignee: SEB S.A., Ecully (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,433

(22) Filed: Jan. 28, 2019

(65) Prior Publication Data

US 2019/0159626 A1   May 30, 2019

Related U.S. Application Data

(63) Continuation of application No. 13/320,702, filed as application No. PCT/FR2010/050924 on May 12, 2010, now Pat. No. 10,264,915.

(30) Foreign Application Priority Data

May 15, 2009  (FR) ..................................... 09 53255

(51) Int. Cl.
  A47J 27/00   (2006.01)
  A47J 36/02   (2006.01)
  (Continued)

(52) U.S. Cl.
  CPC .............. *A47J 36/02* (2013.01); *B05D 5/086* (2013.01); *B05D 1/10* (2013.01)

(58) Field of Classification Search
  CPC .......... A47J 36/02; A47J 36/025; A47J 37/10; B05D 1/10; B05D 5/086
  (Continued)

(56) References Cited

U.S. PATENT DOCUMENTS 3,473,952 A   10/1969  McFadden
3,837,895 A    9/1974  Pryor
(Continued)

FOREIGN PATENT DOCUMENTS

CN   101001702 A   7/2007
CN   101176616 A   5/2008
(Continued)

OTHER PUBLICATIONS

English Translation of Official Notice of Rejection in Japanese Patent Application No. 2015-076205, dated Mar. 29, 2016, 12 pages.
(Continued)

*Primary Examiner* — Elizabeth J Volz
(74) *Attorney, Agent, or Firm* — Loeb & Loeb LLP

(57) ABSTRACT

The invention relates to a cooking utensil comprising a hollow bowl with a base and a side wall rising from the base, and including at least one fragile area. The bowl has a concave inner surface for receiving food, as well as a convex outer surface. The utensil is coated successively, from the bowl, with a hard base and a nonstick coating, which covers the hard base and includes at least one layer containing at least one fluorocarbon resin. The hard base has a layer that is at least broken at the fragile area. The invention also relates to a method for producing such a utensil.

7 Claims, 2 Drawing Sheets

(51) Int. Cl.
*B05D 5/08* (2006.01)
*B05D 1/10* (2006.01)

(58) Field of Classification Search
USPC ............... 220/573.1, 573.2, 912; 126/390.1;
427/552; 428/64.1, 201, 209, 615, 623,
428/626, 639, 650, 685
See application file for complete search history.

(56) References Cited

U.S. PATENT DOCUMENTS

| | | | |
|---|---|---|---|
| 4,591,530 A | 5/1986 | Lui | |
| 6,382,454 B1 | 5/2002 | Buffard | |
| 10,264,915 B2 * | 4/2019 | Perillon | ............... A47J 36/02 |

FOREIGN PATENT DOCUMENTS

| | | |
|---|---|---|
| FR | 2791065 A1 | 9/2000 |
| FR | 2923696 A1 | 5/2009 |
| GB | 1205268 A | 9/1967 |
| JP | S60190414 A | 9/1985 |
| JP | H01141619 A | 6/1989 |
| JP | H01215741 A | 8/1989 |
| JP | H03159623 A | 7/1991 |
| JP | H04329860 A | 11/1992 |
| JP | H04341221 A | 11/1992 |
| JP | H08189756 A | 7/1996 |
| JP | H08322732 A | 12/1996 |
| JP | H0912938 A | 1/1997 |
| JP | H09012938 | 1/1997 |
| JP | H10323283 A | 12/1998 |
| JP | 2000312646 A | 11/2000 |
| JP | 2003524537 | 8/2003 |
| JP | 2009011833 A | 1/2009 |
| JP | 2009034378 A | 2/2009 |
| WO | 0056537 A1 | 9/2000 |

OTHER PUBLICATIONS

The State Intellectual Property Office of the People's Republic of China, The First Office Action, Chinese Patent Application No. 201080020636.2 dated Dec. 3, 2013, and English translation thereof (21 pages).
The Japan Patent Office, Office Action, Japanese Patent Application No. 2012-510348, dated Jan. 21, 2014 (9 pages).
International Search Report from PCT/FR2010/050924 dated Jul. 27, 2010. (4 pages).

* cited by examiner

COOKING UTENSIL COMPRISING A HARD BASE MADE FROM CERAMIC AND/OR METAL AND/OR POLYMER MATERIAL AND A NONSTICK COATING CONTAINING A FLUOROCARBON RESIN

CROSS-REFERENCE TO RELATED APPLICATIONS

This application is a continuation under 35 U.S.C. § 120 of U.S. patent application Ser. No. 13/302,702 entitled "Cooking Utensil Comprising a Hard Base Made from a Ceramic and/or Metal and/or Polymer Material and a nonstick Coating Containing a Fluorocarbon Resin", filed on Feb. 15, 2012, which is a U.S. National Stage Application under 35 U.S.C. 371 of International Application No. PCT/FR10/50924 entitled "Cooking Utensil Comprising a Hard Base Made from a Ceramic and/or Metal and/or Polymer Material and a nonstick Coating Containing a Fluorocarbon Resin", filed on May 12, 2010, which claims priority to French Application No. 0953255 entitled "Article Culinaire Comportant une Base dure en un Matériau Céramique et/ou Métallique et/ou Polymère et un Revêtement Antiadhésif à Base de Résine Fluorocarbonée", filed on May 15, 2009, the entire contents of which are hereby incorporated by reference.

INTRODUCTION

This invention generally relates to a cooking utensil, of which the bottom has a reinforced inner surface and is provided with a nonstick coating, with high scratch and abrasion resistant properties. The invention also relates to the method for producing the cooking utensil with its reinforced inner surface.

The objective of this invention is to render a cooking utensil nonstick coating, with a fluorinated resin base such as PTFE, more resistant to scratches, wear and abrasion.

BACKGROUND OF THE INVENTION

Cooking utensils comprising a nonstick coating with a fluorocarbon resin base (in particular with a PTFE base) are traditionally favored by the market because they make possible a baking without (or practically without) added greases while still remaining easy to clean. However, such utensils have the disadvantage of a low resistance to scratches. Yet, the resistance to scratches is a property that is difficult to characterize as it depends on several other properties such as the intrinsic hardness of the material, the elasticity, the resistance to abrasion, and the coefficient of friction. As it is not only difficult to measure these properties separately, but also in combination, this is limited in practice to abrasion tests that reveal only imperfectly the cooking reality and to actual kitchen tests.

In order to improve the resistance to scratches of nonstick coatings with a fluorocarbon resin base (in particular with a PTFE base), it is known to those skilled in the art to reinforce the nonstick coating with hard fillers (in particular primers reinforced with hard fillers) or by the interposition of a hard base of the inorganic type between the support of the cooking utensil (generally metal) and the nonstick coating.

The reinforced primers effectively make it possible to substantially improve the resistance to abrasion. But impacts to the metal during the cooking of food such as pork ribs, or during the use of metal spatulas, are also observed.

The inorganic hard bases, such as for example those made from a glaze, make it possible to further improve the resistance to abrasion. Furthermore, the problem of impacts is practically eliminated with such bases. However, new brittleness is introduced, as for example a certain sensitivity to hydrolysis, and the quasi-impossibility to add bottoms via a strike (in order to obtain so-called struck bottoms for utensils compatible with an induction heating, constituted of an aluminum bowl and of a grid made of ferritic stainless steel. The strike allows for the bonding of the grid on the outer surface of the bottom of the bowl).

The resistance to hydrolysis is required due to the porosity of the nonstick coating with a fluorocarbon resin (PTFE) base, in light of the necessity of good resistance in the dishwasher. Yet, a good bonding of the inorganic hard base to the support requires a substantial share of flux, which negatively impacts the resistance to hydrolysis. The use of a hard base having very good properties of adherence to the support (so-called "super-adherent" hard base) is therefore carried out to the detriment of the resistance to the hydrolysis.

It then follows that the use of a hard base with glaze typically remains confined to the reinforcement of utensils that are already formed, in other terms utensils that do not undergo any deformation after the deposit of the hard base. As such, a hard base with glaze cannot be used to reinforce utensils made from a disk for which the formation is carried out after the deposit of the nonstick coating. Another disadvantage of this way of proceeding is the high energy cost of this technology. Indeed, the baking of a hard base with glaze requires a heat treatment of a magnitude of 560° C. for several minutes. This treatment does not pose any problem when the outer surface of the bowls is coated with a glaze, as the baking of the inner glaze (hard base) and outer glaze (decoration) can then be carried out simultaneously. This is not the case if it is desired to coat the outer surface of the utensil with a coating with a PTFE base, which is generally done with a single passage in the oven. The baking of the hard base then imposes an additional passage, which is very costly in terms of energy by the temperatures and the durations of the baking that are required.

Moreover, in the case of multilayer utensils incorporating at least one aluminum layer or in the case of utensils made of stainless steel incorporating an added bottom constituted of ferritic stainless steel and of aluminum, the hard base with glaze, which is in contact with the stainless steel, must have a high softening point that is higher than the melting point of the aluminum. It then follows that the baking (typically at a temperature of at least 800° C.) of this hard base results in the detaching of the various parts of the utensil. A hard base with glaze therefore cannot be used with multilayer products.

For the reasons mentioned above, hard bases with glaze are therefore far from providing a response that is entirely adapted.

Finally, those skilled in the art also know metal or ceramic hard bases applied via plasma or par thermal spraying on a metal support. Typically, using an electric arc, a plasma torch or a flame, a hard base is applied in the form of a continuous layer which covers the entire surface before the coating of the PTFE. These metal or ceramic hard bases are continuous and are generally very thick: they can therefore be applied only for utensils that are already formed. Indeed, the presence of such thick and continuous bases under the nonstick coating prevents any later stamping or forming of the utensils, which prohibits them from being used on flat disks. Moreover, as it is sought to create the smoothest surface possible in order to avoid disturbing the adhesion and the nonstick properties of the coating, it then follows that the application of such bases requires a long time to implement and a succession of tools and layers to create this smooth surface.

Finally, the presence of a ceramic layer over the entire utensil also creates problems during the finishing of the utensil, in particular the operation of trimming is made more expensive by the requirement of special tools and less productivity.

These ceramic and/or metal continuous bases therefore also have disadvantages.

BRIEF DESCRIPTION OF THE INVENTION

This invention therefore has for purpose a cooking utensil and a method for producing such a utensil that overcomes the disadvantages of prior art by the forming, between the inner surface of the utensil and the nonstick coating, of a hard base made of a ceramic and/or metal and/or polymer material, which is at least partially discontinuous on the fragile areas of the utensil.

By fragile area of a cooking utensil, is meant, in the sense of this invention, any portion of the utensil that has been affected mechanically or thermally during the implementation of the initial support, generally in the form of a disk or bowl (in particular by folding, stamping, drawing, welding or trimming).

A particularly sensitive fragile area of a cooking utensil is the connection area between the bottom of the bowl and the side wall as it is the portion of the disk which is deformed (generally stamped) in order to create the side wall.

Another fragile area of a cooking utensil is the upper edge which is trimmed (rectified) in order to give a smooth and flat edge.

Another area that can be mentioned as a fragile area is the area that supports the attaching of the handle as it can be subjected to a deformation consecutive to the welding of the fastener.

More particularly, this invention has for object a cooking utensil comprising a hollow metal bowl which includes a bottom and a side wall rising from the bottom and has at least one fragile area, said bowl having a concave inner surface adapted to receive food and a convex outer surface, said inner surface, more preferably sandblasted, shot-peened or brushed, being coated successively, from the bowl, with a hard base and with a nonstick coating covering said hard base, the nonstick coating comprising at least one layer comprising at least one fluorocarbon resin, alone or in a mixture with at least one resistant thermostable bonding resin at least at 200° C., this resin or resins forming a sintered continuous network, characterized in that the hard base (3) has the form of a layer which is at least discontinuous at the location of the fragile area (23), and in that said hard base is made of a ceramic and/or metal and/or polymer material, which has the form of a superficial dispersion of drops of said material distributed in a substantially homogeneous manner on said inner surface (24) at the location of the fragile area (23) with:

an overlap ratio which is between 30% and 80% of the surface to be covered, and a drop size between 2 μm and 50 μm.

in such a way that the surface density of the drops is between 300 and 2000 drops/mm$^2$.

By overlap ratio, it is meant in the sense of this invention the ratio, expressed as a percentage, of the portion of the surface to be covered of the support which is effectively covered by the superficial dispersion of drops of material, to the surface to be covered by the discontinuous hard base.

By superficial dispersion of drops of ceramic and/or metal and/or polymer material, it is meant in the sense of this invention, a discontinuous ceramic and/or metal and/or polymer layer being in the divided state on a support (here that of the cooking utensil), in such a way that the roughness of this layer is created by the dispersed drops of glaze.

The presence of such a hard base makes it possible to render the nonstick coating more resistant to scratches and to abrasion while still allowing for the implementation operations. With an overlap ratio which is between 30% and 80% of the surface to be covered, a good bonding of the nonstick coating is observed and the time for implementation is as such minimized.

The hollow metal bowl is advantageously a single-layer support made of aluminum, aluminum alloy, aluminum casting (or alloy of casting aluminum alloy, of stainless steel, or of steel casting.

But it is also advantageous within the framework of this invention to use a hollow bowl constituted of a multilayer support comprising from the exterior to the interior the following layers ferritic stainless steel/aluminum/austenitic stainless steel or stainless steel/aluminum/copper/aluminum/austenitic stainless steel or a bowl of casting aluminum, aluminum or aluminum alloys doubled with an outer bottom made of stainless steel.

In terms of aluminum alloys able to be used to carry out the bowl of the cooking utensil 1, according to the invention low alloy glazeable aluminum alloys are recommended, and in particular:

the "pure" aluminums with 99% aluminum of the series 1000, and for example the alloys 1050, 1100, 1200 and 1350, the aluminum and manganese alloys of the series 3000, and for example the alloys 3003, 3004, 3105 and 3005, the aluminum and silicon alloys of the series 4000, the aluminum and magnesium alloys of the series 5000, and for example the alloys 5005, 5050 and 5052, and the aluminum, silicon, magnesium alloys of the series 6000, and for example the alloys 6053, 6060, 6063, 6101 and 6951, and the aluminum, iron, silicon alloys of the series 8000, and for example the alloy 8128.

In terms of casting aluminum alloys able to be used to carry out the support 2 (here a bowl) of the cooking utensil 1, the AS aluminum-silicon alloys are recommended, and more preferably the aluminum-silicon alloys of the type AS7 to AS12, i.e., the AS alloys containing from 7 to 12% silicon in accordance with the former French standard NF AS 02-004.

In terms of stainless steels, ferritic stainless steels and austenitic stainless steels are recommended.

The at least partially discontinuous hard base of the utensil according to the invention is made from a ceramic and/or metal and/or polymer material.

In the case of a hard base made of ceramic and/or metal material, it is preferable that the melting point of the material be higher than that of the metal or of the metal alloy in contact with the hard base.

According to a first alternative of the invention, the hard base is an at least partially discontinuous layer constituted of a mixture of alumina and titanium dioxide.

According to a second alternative of the invention, the hard base is an at least partially discontinuous layer made of a polymer material, more preferably of polyamide-imide (PAI) and/or oxy-1,4-phenylene-oxy-1,4 phenylene-carbonyle-1,4-phenylene (PEEK).

Advantageously, the hard base has a surface roughness Ra between 2 µm and 12 µm, and more preferably between 4 and 8 µm.

By surface roughness Ra, it is meant, in the sense of this invention, the arithmetic mean difference between the valleys and the peaks of the surface in relation to the center line (or mean), with this difference being estimated according to the ISO 4287 standard.

A roughness less than 2 µm results in a lower adherence of the nonstick coating to the hard base, while a roughness greater than 12 µm has for consequence that the nonstick coating is no longer smooth.

Now with regards to the nonstick coating, the latter contains at least one fluorocarbon resin alone or in a mixture with a resin that is thermostable and resistant to at least 200° C., with these resins forming after baking a sintered continuous network.

The fluorocarbon resin is advantageously selected from among polytetrafluoroethylene (PTFE), copolymer of tetrafluoroethylene and of perfluoropropylvinylether (PFA), copolymer of tetrafluoroethylene and of hexafluoropropylene (FEP), and their mixtures (in particular a mixture of PTFE and PFA).

The resin or resins that are thermostable and resistant to at least 200° C. are advantageously selected from among the polyamide imides (PAI), polyether imides (PEI), polyimides (PI), polyetherketones (PEK), polyetheretherketones (PEEK), polyethersulfones (PES) and polyphenylene sulfide (PPS).

Advantageously, the nonstick coating comprises successively, from the hard base, a bonding primer layer, and at least one top layer.

The primary layer can also advantageously include fillers and/or pigments.

In terms of the fillers that can be used in the primer of the cooking utensil according to the invention, colloidal silica, mica flakes covered with $TiO_2$, alumina, corundum, silicon carbide, quartz and mixtures of these can in particular be mentioned.

In terms of the pigments that can be used in the primer of the cooking utensil 1 according to the invention, carbon black, iron oxides, and mixed oxides of cobalt and of manganese, titanium dioxide can in particular be mentioned.

This invention also has for object a method for producing a cooking utensil comprising the following steps:

a) a step of supplying a metal support in the form of a disk, comprising two opposite surfaces;

b) a step of forming of said support in order to give it the shape of a bowl, which includes a bottom and a side wall rising from the bottom and has at least one fragile area, and as such define a concave inner surface adapted to receive food and a convex outer surface;

c) optionally, a step of treating the inner surface of the support, in order to obtain a treated inner surface favoring the adherence of a hard base on the support;

d) a step of carrying out a adhering hard base on said inner surface of the support;

e) a step of carrying out a nonstick coating on said hard base formed in the step d);

said method being characterized in that the step d) of carrying out the hard base comprises a thermal spraying, on said inner surface of a ceramic and/or metal and/or polymer material having a powdery form, in such a way as to form on said inner surface of the bowl a layer which is at least discontinuous on the fragile area, the discontinuous portion having the form of a superficial dispersion of drops distributed in a substantially homogeneous manner on said inner surface at least at the location of the fragile area, with:

an overlap ratio which is between 30% and 80% of the surface to be covered, and a drop size between 2 µm and 50 µm, and in that the step b) of forming of the support is carried out either before the step d) of carrying out the hard base, or after the step e) of carrying out the nonstick coating.

The thermal spraying can in particular be a flame spraying, or a plasma spraying, or a spraying via arc-spray, without this list being restrictive. However, for economic reasons and facility of implementation, a flame spraying is more preferably used.

The material intended to be sprayed with the flame in order to be used as a hard base can advantageously have the form of a powder of granulometry between 5 and 65 µm. This granulometry makes it possible to have a good flow in the supply hopper, limits dust during manipulations and has thermal inertia which is sufficiently low enough to be able to melt completely when passed through the flame.

Advantageously, the step d) of carrying out the hard base is preceded with a step of preheating said support or said bowl according to whether the step b) of forming is carried out before the carrying out d) of the hard base or after the carrying out e) of said nonstick coating. This preheating is adapted to the nature of the support and of the material sprayed. The preheating of the support prevents a brutal cooling of the molten drop which can limit the adherence of it.

The nonstick coating is formed in the following way on the hard base: the step c) of carrying out the nonstick coating comprises a step of depositing, on said hard base, of at least one composition with a fluorocarbon resin base, then a step of sintering, more preferably between 380° C. and 450° C.

BRIEF DESCRIPTION OF THE FIGURES

Other advantages and particularities of this invention shall result from the following description, provided by way of a non-restricted example and made in reference to the annexed figures.

DETAILED DESCRIPTION OF THE INVENTION

Figure 1:
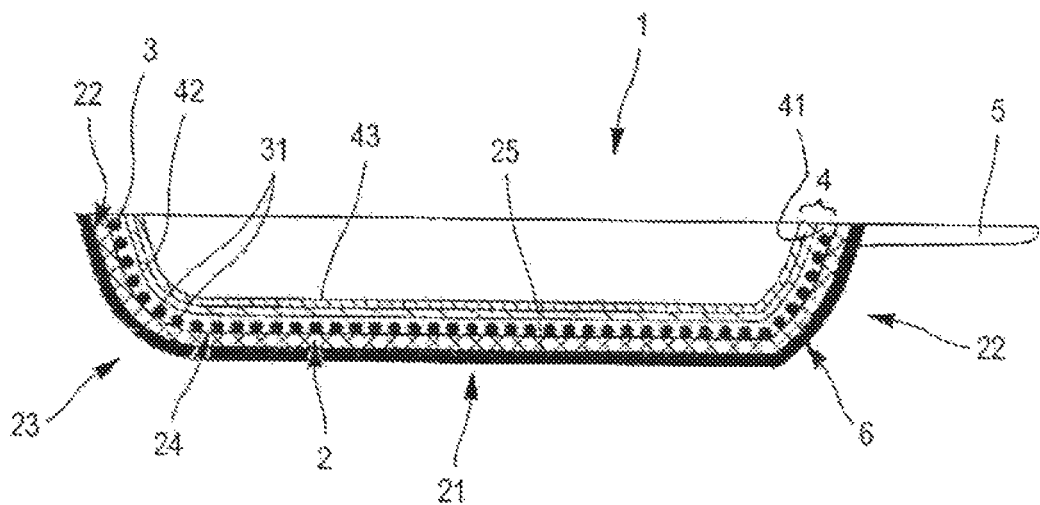
FIG. 1 shows a diagrammatical cross-section view of a cooking utensil in accordance with the invention according to a first alternative.
Figure 2:
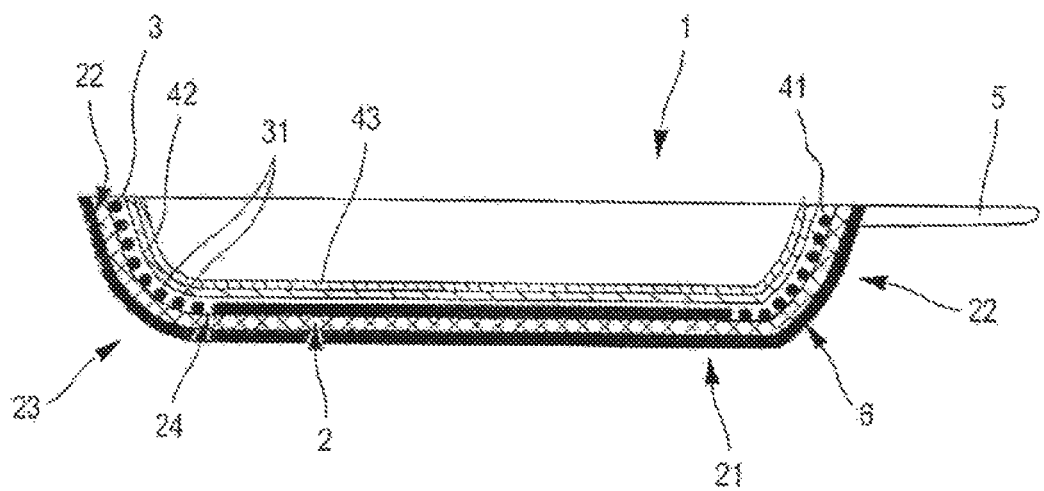
FIG. 2 shows a diagrammatical cross-section view of a cooking utensil in accordance with the invention according to a second alternative.

The identical elements shown in the FIGS. 1 and 2 are identified by identical numerical references.

Figure 3:
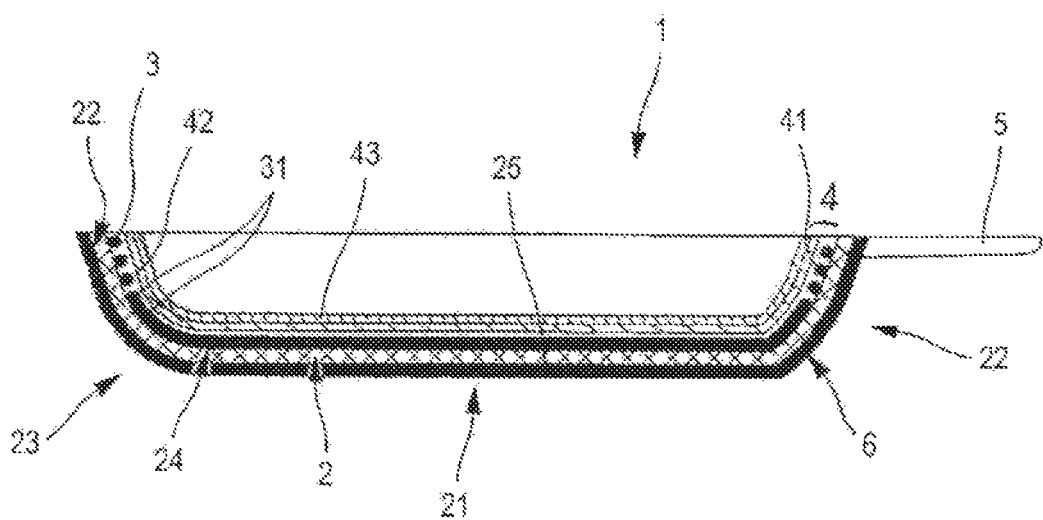
FIG. 3 shows a diagrammatical cross-section view of a cooking utensil in accordance with the invention according to a third alternative.

FIGS. 1 to 3 show, by way of example of a cooking utensil according to the invention, a frying pan 1 comprising a metal support 2 having the form of a hollow bowl and a grasping handle 5. The support 2 comprises an inner surface 24 which is the surface oriented towards the side of the food able to be received in the frying pan 1, and an outer surface 25 which is intended to be arranged towards an external heat source.

The inner surface 24 is coated successively, from the support 2, with a hard base 3 in accordance with this invention, and with a nonstick coating 4 which successively includes from the hard base 3 a bonding primer layer 41 and two top layers 42, 43.

Moreover, FIGS. 1 to 3 also show that the outer surface 22 of the support 2 is advantageously coated with an exterior covering coating 6 (for example with glaze), the thickness of this covering coating 6 being conventionally between 20 μm and 300 μm.

In the alternative embodiment shown in FIG. 1, the hard base 3 is entirely discontinuous (over the entire inner surface 24 of the support 2) comprising a superficial dispersion of drops 31 of a ceramic and/or metal and/or polymer material (such as defined hereinabove). These drops are solidified and have an average size between 2 μm and 50 μm and are distributed homogeneously on the surface of the inner surface 21, with an overlap ratio of the inner surface between 40 and 80%, with a surface density between 300 drops/mm$^2$ and 2000 drops/mm$^2$.

In this alternative embodiment, the drops of the ceramic and/or metal and/or polymer material 31 dispersed on the surface of the inner surface 24 are embedded in the primary layer 41 of the nonstick coating 4, in such a way as to allow for the bonding of the primary layer to the hard base 3. Such a hard base 3 leads to an increased mechanical reinforcement of the nonstick coating 4, particularly in terms of hardness and of adherence to the underlying hard base 3. Indeed, the particles of sintered fluorocarbon resin and the fillers of the primary layer 41 by penetrating between the drops of the solidified ceramic and/or metal and/or polymer material 31 deposited on the surface of the inner surface 24, reinforce the adherence of the primary layer 41 on the hard base 3. Therefore, the mechanical reinforcement of the nonstick coating 4 is increased thanks to the fillers in the primary layer 41 as well as to the dispersion of drops 31 of the hard base 3 which play a role analogous to that of a reinforcing filler in the interpenetration area of the two layers 3, 41.

In the alternative embodiment shown in FIG. 2, the hard base 3 is a continuous layer of ceramic and/or metal and/or polymer material on the bottom 21 and discontinuous on the connection area 23 between the bottom 21 and the side walls 22, and on the side walls 22.

Such a combination can be advantageously obtained by adjusting the spraying times according to the zones intended to be covered with a deposit that is either continuous or discontinuous, i.e. by having a slow displacement of the torch in the non-fragile areas (in order to form a continuous hard base area) and a fast displacement in the fragile areas (in order to form a discontinuous hard base area).

In the alternative embodiment shown in FIG. 3, the hard base 3 is a continuous layer of ceramic and/or metal and/or polymer material on the bottom 21 and on the connection area 23 between the bottom 21 and the side walls 22, and discontinuous on the side walls 22.

EXAMPLES

Operating Procedure
  Equipment: CASTOLIN DS 8000 torch with nozzle diameter 30 mm
  Twin 20 Sulzer-Metco powder dispenser
  Gas propellant: argon or air 4 Nl/min
  Combustible gas: acetylene 14 Nl/min Oxygen 31 Nl/min
  Temperature of the support during the application of the hard base: greater than or equal to the ambient temperature (of a magnitude of 20-25° C.) and preferably greater than or equal to 200° C. for a ceramic powder
  Spraying time: from 0.5 to 20 s for a frying pan 26 cm in diameter
  Application of the PTFE: via gun spraying (with a roller or via screen printing)

Tests

Evaluation of the Resistance to Abrasion

The resistance to abrasion of the nonstick coating formed is evaluated by subjecting the latter to the action of an abrasive pad of the green SCOTCH BRITE (registered trademark) type.

The resistance to abrasion of the coating is estimated quantitatively by the number of passages of the pad that are required to create the first scratch (corresponding to the appearance of the metal that constitutes the support).

The anti-adherence is measured according to the more or less easy cleaning of the carbonized milk. The scoring is as follows:
  100: means that the film of carbonized milk is fully eliminated by the simple application of a stream of water from the kitchen faucet;
  50: means that circular movements of the object must be added under the stream of water in order to completely delaminate the carbonized film;
  25: means that it is necessary to soak for 10 minutes and possibly force the departure by passing a wet sponge in order to completely eliminate the film;
  0: means that at the end of the preceding process, all or a portion of the carbonized film remains adherent.

Evaluation of the Adherence

The adherence of the nonstick coating on the hard base is also evaluated. For this, a test of adherence by surface grid is carried out according to ISO standard 2409, followed by an immersion of the utensil for 9 hours (via 3 three-hour cycles in boiling water). Then, it is observed whether or not the nonstick coating has a delamination.

The scoring is as follows:
  no square must be delaminated in order to obtain a score of 100 (excellent adherence);
  in case of delamination the value measured is equal to 100 minus the number of delaminated squares.

Example 1

Cooking Utensil According to the Invention with a Discontinuous Ceramic Hard Base An aluminum disk 3003 of diameter 330 mm is degreased then brushed in order to obtain a roughness Ra of 1.5 μm. This disk is preheated to a temperature between 150° C. and 200° C.

The torch is used to apply a ceramic powder constituted of an alumina/titanium dioxide mixture (at the rate of 87% alumina and 13% titanium dioxide) in order to obtain a discontinuous deposit across the entire surface of 1.5 g and a roughness of 4 μm.

This disk prepared as such is successively covered with a primary layer and a top layer with a PTFE base.

After baking at 415° C., the disk prepared as such is stamped in order to produce a bowl with a bottom of diameter 26 cm, interiorly coated with PTFE (nonstick coating).

This coating does not have any cracks, or losses of adhesion.

After an aging of three 3-hour cycles in contact with boiling water, the adherence measured using a surface grid is equal to 100%.

This type of bowl is also tested for its resistance in the dishwasher, after 20 washing cycles, the coating does not have any cracks or blisters.

An abrasion test is also carried out via "back and forth" passages with an abrasive pad. After 20,000 passages, the coating does not have any scratches in the metal and its anti-adherence measured by the cleaning of the carbonized milk is 50.

Example 2

Cooking Utensil According to the Invention with a Discontinuous Ceramic Hard Base An aluminum bowl 3003 of diameter 260 mm is degreased and sandblasted in order to obtain a roughness Ra of 2 µm. This bowl is preheated to a temperature between 150° C. and 200° C.

The torch is used to apply a ceramic powder of the alumina/titanium dioxide type (87%/13% respectively) in order to obtain a discontinuous deposit of 0.9 g and a roughness Ra of 3.5 µm.

After cooling this bowl prepared as such is successively covered with a primary layer and a top layer with a PTFE base.

The coating is sintered at a temperature of 415° C. for 7 minutes.

After cooling, the coating does not have any cracks, or losses of adhesion.

After an aging of three 3-hour cycles in contact with boiling water, the adherence measured using a surface grid is equal to 100%.

This type of bowl is also tested for its resistance in the dishwasher: after 20 washing cycles, the coating does not have any cracks or blisters.

This type of bowl is also subjected to the same abrasion test as in example 1. After 20,000 passages, the coating does not have any scratches in the metal and its anti-adherence measured by the cleaning of the carbonized milk is 100.

Example 3

Multilayer Cooking Utensil According to the Invention with a Discontinuous Ceramic Hard Base A multilayer bowl of diameter 260 mm, associating an outer sheet made of ferritic steel of thickness 0.5 mm, an intermediary sheet made of aluminum 3003 of thickness 2 mm and an outer sheet made of austenitic stainless steel of thickness 0.5 mm, is degreased and microblasted (on the inner sheet) in order to obtain a roughness Ra of 1.3 µm. This bowl is preheated to a temperature between 150° C. and 200° C.

The torch is used to apply a ceramic powder of the alumina/titanium dioxide type (87%/13% respectively) in order to obtain a discontinuous deposit of 1.2 g and a roughness Ra of 3 µm.

After cooling, this bowl prepared as such is successively covered with a primary layer and a top layer with a PTFE base. The coating is sintered at a temperature of 415° C. for 7 minutes, then cooled.

After cooling, the coating does not have any cracks, or losses of adhesion.

After an aging of three 3-hour cycles in contact with boiling water, the adherence measured using a surface grid is equal to 100%.

This type of bowl is also tested for its resistance in the dishwasher, after 20 washing cycles, the coating does not have any cracks or blisters.

This type of bowl is also subjected to the same abrasion test as in examples 1 and 2. After 20,000 passages, the coating does not have any scratches in the metal and its anti-adherence measured by the cleaning of the carbonized milk is 100.

Example 4

Multilayer Control Cooking Utensil with a Discontinuous Hard Base with Glaze

A multilayer "control" bowl of diameter 260 mm, associating an outer sheet made of ferritic steel of thickness 0.5 mm, an intermediary sheet made of aluminum 3003 of thickness 2 mm and an outer sheet made of austenitic stainless steel of thickness 0.5 mm, is degreased and microblasted in order to obtain a roughness Ra of 1.3 µm. Gun spraying is used at ambient temperature to apply a glaze slip for steel with a softening point 720° C. in such a way as to obtain a discontinuous deposit of 1.2 g and of roughness 3 µm.

This bowl is baked at 750° C. in order to obtain the gelation of the glaze. At this temperature, the complete delamination of the multilayer bowl is observed.

Example 5

Control Cooking Utensil with a Continuous Hard Base Made of Ceramic

An aluminum disk 3003 of diameter 330 mm is degreased then brushed in order to obtain a roughness of 1.5 µm.

The torch is used to apply a ceramic of the alumina/titanium dioxide type (87%/13% respectively) in order to obtain a continuous deposit of 8 g and a roughness of 8 µm over the entire bowl i.e. on the fragile and non-fragile areas.

This disk prepared as such is successively covered with a primary layer and a top layer with a PTFE base.

After baking at 415° C., the disk is stamped in order to produce a bowl of diameter 26 cm coated interiorly.

At stamping, a fracture of the hard base is observed in the folding areas and the coating has many cracks and losses of adherence.

After an aging of three 3-hour cycles in contact with boiling water, the adherence, measured using a surface grid, is equal to 0%.

Example 6

Cooking Utensil According to the Invention with a Discontinuous Metal Hard Base

An aluminum bowl 3003 of diameter 260 mm is degreased and sandblasted in order to obtain a surface roughness Ra of 2 µm. This bowl is preheated to 150° C.

The torch is used to apply an aluminum alloy powder 4917 in order to obtain a discontinuous deposit of 1 g and a roughness of 3.5 µm.

After cooling this bowl prepared as such is successively covered with a primary layer and a top layer with a PTFE base.

The coating is sintered at a temperature of 415° C. for 7 minutes.

After cooling, the coating does not have any cracks, or losses of adhesion.

After an aging of three 3-hour cycles in contact with boiling water, the adherence measured using a surface grid is equal to 100%.

This type of bowl is also tested for its resistance in the dishwasher: after 20 washing cycles, the coating does not have any cracks or blisters.

This type of bowl is also subjected to the same abrasion test as in example 1. After 20,000 passages, the coating does not have any scratches in the metal and its anti-adherence measured by the cleaning of the carbonized milk is 100.

Example 7

Cooking Utensil According to the Invention with a Discontinuous Metal Hard Base

An aluminum bowl 3003 of diameter 260 mm is degreased and sandblasted in order to obtain a surface roughness Ra of 2 μm. This bowl is preheated to 200° C.

The torch is used to apply a stainless steel 304 LHD powder (granulometry +150 0.6%; −45 43%: granulometry obtained by screening giving 0.6% of the particles greater than 150 μm and 43% less than 45 μm) containing 11.6% Ni and 19% Cr in order to obtain a discontinuous deposit of 1.1 g and a roughness Ra of 3.2 μm.

After cooling this bowl prepared as such is successively covered with a primary layer and a top layer with a PTFE base.

The coating is sintered at a temperature of 415° C. for 7 minutes.

After cooling, the coating does not have any cracks, or losses of adhesion.

After an aging of three 3-hour cycles in contact with boiling water, the adherence measured using a surface grid is equal to 100%.

This type of bowl is also tested for its resistance in the dishwasher: after 20 washing cycles, the coating does not have any cracks or blisters.

This type of bowl is also subjected to the same abrasion test as in example 1. After 20,000 passages, the coating does not have any scratches in the metal and its anti-adherence measured by the cleaning of the carbonized milk is 100.

Example 8

Cooking Utensil According to the Invention with a Discontinuous Polymer Hard Base An aluminum disk 3003 of diameter 330 mm is degreased then brushed in order to obtain a roughness Ra of 1.5 μm. This disk is preheated to a temperature of 150° C.

The torch is used to apply a PEEK (polyether ether ketone) powder manufactured and marketed by VICTREX under the trade name VICOTE® PEEK™ 709 in order to obtain a discontinuous deposit of 0.8 g and a roughness of 2.7 μm.

This disk prepared as such is successively covered with a primary layer and a top layer with a PTFE base.

After baking at 415° C., the disk prepared as such is stamped in order to produce a bowl with a bottom of diameter 26 cm, interiorly coated with PTFE (nonstick coating).

This coating does not have any cracks, or losses of adhesion.

After an aging of 3 3-hour cycles in contact with boiling water, the adherence measured using a surface grid is equal to 100%.

This type of bowl is also tested for its resistance in the dishwasher: after 20 washing cycles, the coating does not have any cracks or blisters.

An abrasion test is also carried out via "back and forth" passages with an abrasive pad. After 15,000 passages, the coating does not have any scratches in the metal and its anti-adherence measured by the cleaning of the carbonized milk is 50.

The invention claimed is:

1. A method for producing a cooking utensil, comprising the following steps:
    a) supplying a metal support in the form of a disk;
    b) forming said metal support to give it the shape of a bowl, including a bottom, side walls rising from the bottom and having at least one fragile area, the at least one fragile area being the connection area between the bottom and side walls, a concave inner surface adapted to receive food, and a convex outer surface;
    c) adhering a hard base on said inner surface of the support, wherein adhering the hard base comprises:
        thermal spraying a ceramic and/or metal and/or polymer material having a powdery form on said inner surface of the bowl to form a layer which is at least discontinuous on the at least one fragile area, the discontinuous layer having the form of a superficial dispersion of drops of said material distributed in a substantially homogeneous manner on said inner surface at least at the location of the at least one fragile area, with:
            an overlap ratio which is between 30% and 80% of the surface to be covered, and
            a drop size between 2 μm and 50 μm,
        and wherein the hard base has a surface roughness (Ra) between 2 μm and 12 μm;
    d) adding a nonstick coating on said hard base, wherein the nonstick coating comprises at least one layer including at least one fluorocarbon resin, alone or in a mixture with at least one resistant thermostable bonding resin at least at 200° C., with the resin or resins forming a sintered continuous network.

2. The method according to claim 1, wherein the thermal spraying is a flame spraying.

3. The method according to claim 2, wherein the material to be sprayed is a powdery material having a granulometry from 5 μm to 65 μm.

4. The method according to claim 3, wherein the powdery material has a granulometry of 20 μm to 45 μm.

5. The method according to claim 1, wherein adhering the hard base is preceded with a step of preheating of said metal support if step b) is performed before adhering the hard base or preheating said bowl if step b) is performed after adding said nonstick coating.

6. The method according to claim 1, comprising a further step of treating the inner surface of the support to obtain a treated inner surface that will allow the adherence of a hard base on the support before the step c) of adhering the hard base on said inner surface of the support is performed.

7. The method according to claim 1, wherein the step d) of adding the nonstick coating comprises a step of depositing on said hard base the at least one fluorocarbon resin, and a step of sintering.

* * * * *